United States Patent [19]

Doi et al.

[11] 3,925,602

[45] Dec. 9, 1975

[54] APPARATUS FOR ENGRAVING A PORTRAIT ON CERTIFICATION CARD

[75] Inventors: Yasushi Doi, Kyoto; Mikio Shoda, Nagaokakyo; Masatoshi Oguri; Joji Hashimoto, both of Kyoto, all of Japan

[73] Assignee: Dainippon Screen Seizo Kabushiki-Kaisha, Kyoto, Japan

[22] Filed: Oct. 19, 1973

[21] Appl. No.: 408,162

[30] Foreign Application Priority Data

Oct. 31, 1972 Japan.............................. 47-108501

[52] U.S. Cl. ............................ 178/6.6 B; 178/6.6 R

[51] Int. Cl............................. G03f 7/00; H04n 1/22

[58] Field of Search ............ 178/6.6 R, 6.6 B, 6.7 R

[56] References Cited

UNITED STATES PATENTS

| | | | |
|---|---|---|---|
| 2,005,130 | 6/1935 | Dalton | 178/6.6 B |
| 2,092,765 | 9/1937 | Losier | 178/6.6 B |
| 2,415,450 | 2/1947 | Swann | 178/6.6 B |
| 2,909,598 | 10/1959 | Lifferth | 178/6.6 B |
| 2,925,464 | 2/1960 | Raible | 178/6.6 B |
| 3,264,889 | 8/1966 | Machida et al. | 178/6.6 B |

*Primary Examiner*—Raymond F. Cardillo, Jr.
*Attorney, Agent, or Firm*—Zarley, McKee, Thomte & Voorhees

[57] ABSTRACT

An original portrait (person's face picture) and a mount or base plate for a certification card are attached to a laterally slidable base arranged to be driven in a reciprocating manner, and, upon each reciprocation, move through a distance of one scanning pitch at one time transversely to the direction of movement of said slidable base, and then said original portrait is scanned in linear succession by a photoelectric scanning device in accordance with movement of said slidable base to obtain a signal current, so as to control a graver by said signal current and thereby reproduce on said card mount a halftone image similar to said original.

1 Claim, 2 Drawing Figures

APPARATUS FOR ENGRAVING A PORTRAIT ON CERTIFICATION CARD

This invention relates to an engraving apparatus for reproducing the pattern of an original picture by first photoelectrically scanning the original having a certain gradation to obtain an image signal current and thereby engraving on a base plate halftone dots of various sizes according to the gradation of the original picture.

The apparatus of the present invention is used for instance for exhibiting the owner's portrait or face picture on a certification card for proving that the person who carries a certification card such as identification card, bank card, credit card or other various kinds of license cards is the real owner of the card.

Heretofore, for exhibiting a person's portrait on a certification card such as above-mentioned, the general practice has been to paste a photograph printed to a suitable size on the card. This method, however, is not perfectly fool-proof against forgery or falsification, and further, since the printing paper of the photograph is pasted on the card mount, the photograph-pasted portion dwells in a plane above the card mount which creates problems when a card collator is used. This method is also liable to cause loosening, removal, or damage of the photograph.

In order to overcome such problems, the present invention proposes an improved apparatus for exhibiting an owner's face picture on a card by engraving, like a halftone block, the picture on the surface of the specially prepared base plate for a certification card.

Figure 1:
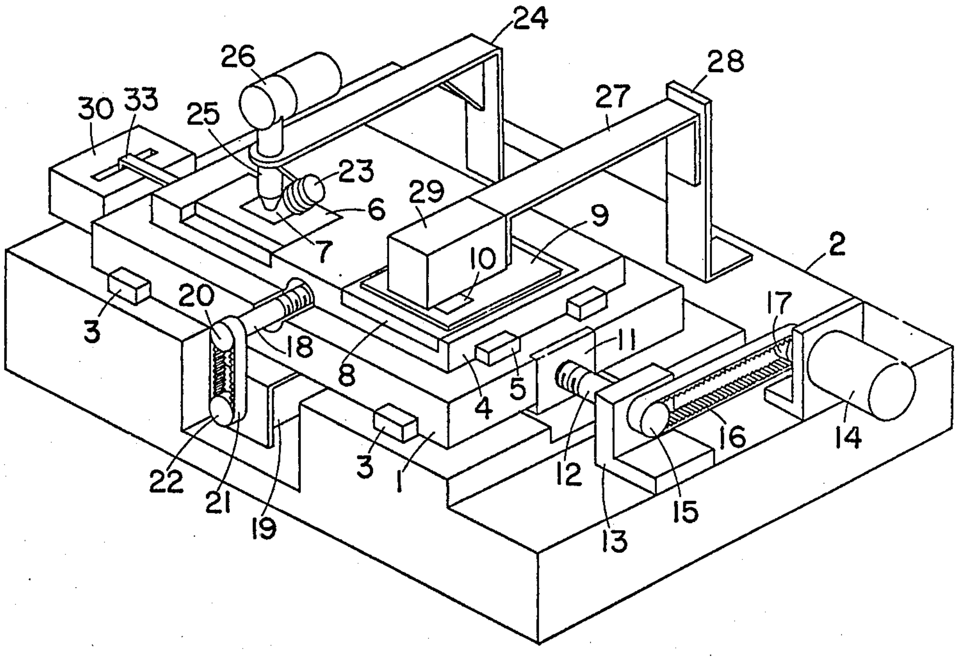
Figure 2:
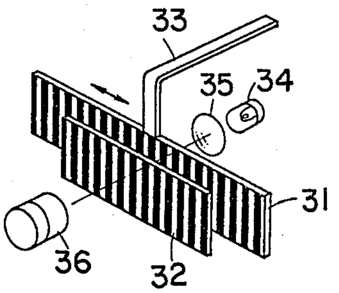

Now, the invention is described in detail with reference to the accompanying drawings, in which:

FIG. 1 is a general perspective view showing the mechanical arrangements of the apparatus according to the present invention; and FIG. 2 is a perspective view of a linear encoder for controlling the mesh point pitch.

As will be seen in FIG. 1, a movable base 1 is rested on the upper face of a frame 2 so that said base will be slidable sidewise along a guide 3 secured to said frame 2. On said slidable base 1 is placed another movable base 4 such that the latter will be slidable in the longitudinal direction along a guide 5 secured to said base 1. Mounted on said base 4 are an original picture holder 6 for holding an original picture 7 and a base plate holder 8 for holding the base plate 9 for a certification card. Numeral 10 indicates the part on the base plate 9 where the image is to be engraved.

At an end of the laterally slidable base 1 is secured a nut 11 through which a feed screw 12 is threadably fitted. Said feed screw 12 is rotatably supported by a bearing 13 and is driven by a pulse motor 14 through a pulley 15, a belt 16 and a motor pulley 17 to move the laterally slida!be base 1 along the guide 3. The belt 16 is a so-called timing belt made of rubber and having on its inner face the protuberances which are engaged with the corresponding gear-like recesses formed on the pulleys 15 and 17.

Secured to the underside of said longitudinally slidable base 4 is a nut (not shown) into which a feed screw 18 is threadedly fixed. Said feed screw 18 is driven by a DC motor 19 secured to the underside of the laterally slidable base 3 through a pulley 20, a belt 21 and a motor pulley 22 to move the longitudinally slidable base 4 along the guide 5.

Also provided in the frame 2 are a photoelectric scanning means and an engraving scanning means. The photoelectric scanning means consists of a lamp 23 supported by a bracket 24 erected on the frame 2, a photoelectric system 25 and a phototube 26, while the engraving scanning means consists of an arm 27 supported by a bracket 28 erected on the frame 2 and an engraving head 29 secured at the end of said arm 27.

The present apparatus operates as follows.

First, the original picture 7 and the base plate 9 are placed at the respective predetermined positions in the corresponding holders 6 and 8, and then the DC motor 19 is operated to move the slidable base 4 in the longitudinal direction. It is to be noted here that limit switches, not shown, are provided at both ends of the sliding stroke of the longitudinally slidable base 4 so as to reverse the positive and negative of the current to the DC motor so that the longitudinally slidable base 4 will move reciprocatingly always through a fixed distance. Upon each reciprocation of the longitudinally slidable base 4, the pulse motor 14 is excited to rotate intermittently to let the laterally slidable base 1 move through one scanning pitch upon each said reciprocation. Thus, if the above operation is conducted by setting the position of the laterally slidable base 2 such that the scanning point of the photoelectric scanning means coincides with one end of the original picture 7, said original picture is moved through one scanning pitch upon each reciprocation, until finally the scanning over the entire face is completed.

In the above-said scanning operation, the surface of the original picture 7 on the optical axis of the optical system 25 is illuminated with the lamp 23, and the reflected light is passed through the optical system 25 into the phototube 26, whereupon there is produced an image signal current corresponding to the gradation of the lights and shades of the original picture 7. This signal current, after suitable amplication and further necessary modulation such as correction of gradation, is then fed to the engraving head 29. Such modulation can be effected with means commonly employed in the image scanning and recording devices such as a conventional color scanner for photoengraving process or facsimile, so no further explanation in this respect is given here.

The engraving head 29 is provided at its bottom with a graver which vertically oscillates to the face of the base plate 9 for the certification card by an electromagnetic coil or other means, whereby the mesh points are engraved along the scanning line in association with scanning movement of the longitudinally slidable base 4. In this case, the depth of engraving varies according to the amount of said image signal current. That is, the engraving is deep in the bright part of the original picture and shallow in the dark part. Therefore, if for instance a white-colored plastic plate is used as the base plate 9 and the engraved face is colored with a dark color, for example black, the white color of the base plate appears in the engraved part and the meshy plate image is manifested by the color of the surface of the remaining part. In the present embodiment, the time required for completing the engraving reproduction was about 1 minute and 30 seconds in case the image size was 26 × 18 mm and the screen pitch 0.2 mm (127 lines/inch).

The operation of the engraved reproduction apparatus of the present invention is as substantially described above, but in this type of image scanning and recording apparatus there often arises the problem of deterioration of the image quality due to non-uniformity of the engraved dot pitch.

The present invention has for its additional important object to solve the problems enumerated above, and now the means and way for overcoming said problem according to the present invention are described.

For the main scanning direction, that is, the direction of scanning effected by reciprocating movement of the longitudinally slidable base 4, there is used a linear encoder which is indicated by reference numeral 30 in FIG. 1 and shown in detail in FIG. 2, and the operation of the engraving edge is controlled by the timing pulse signal obtained from said linear encoder.

More specifically, as shown in FIG. 2, the linear encoder 30 comprises two transparent plates 31 and 32 each of which is provided with opaque parallel lines having a pitch equal to the desired mesh point pitch, said both plates being placed in overlapping relationship with respect to each other so that their respective opaque parallel lines will be arranged parallel to each other. One of said transparent plates 31 is secured to the longitudinally slidable base 4 through an arm 33 while the other transparent plate 32 is directly secured to a suitable part of the laterally slidable base 1. On one side of said two transparent plates 31 and 32 are provided a light source 34 and a condensing lens 35, and on the other side is provided a photo-electric converter device 36 such as phototransistor. When the longitudinally slidable base 4 is driven, the transparent plate 31 is moved reciprocatively as shown by double-headed arrow, so that the photo-electric converter means 36 generates a signal current upon every movement of one mesh point pitch of the longitudinally slidable base 4 with movement of the parallel lines provided on said two transparent plates 31, 32.

The thus obtained signal current is suitably amplified and supplied to the engraving head 29 together with the image signal current to operate the engraving edge to thereby control the dot pitch. According to this present system, the dots with perfectly regulated pitch and phase are engraved for the main scanning direction.

On the other hand, great difficulties are encountered in eliminating non-uniformity of pitch for the sub-scanning direction, that is to say, for the side where the laterally slidable base 1 is moved pitch by pitch in accordance with intermittent rotation of the pulse motor 14. The above-described electric mesh point pitch controlling system, by use of a linear encoder as used for the main scanning side, is not suitable for the sub-scanning side, so means is provided to mechanically drive the laterally slidable base 1 intermittently, inasmuch as the pattern of non-uniformity of pitch is affected mostly by mechanical precision of the driving means.

In such a case, it is generally attempted to elevate precision of the respective component parts of the driving means to informalize the absolute infeed to thereby eliminate pitch irregularity. However, in case where the scanning line pitch is extremely small, such as for example 0.2 mm, as in the apparatus of the present invention, even a slight distortion of the scanning line pitch produces distinct irregular streaks in the obtained halftone block image to invite excessive deterioration of the image quality. Therefor, extremely high accuracy of finishing is required for each component part, resulting in elevated cost of the apparatus as a whole. However, since it is desirable, from its nature, to install at least one unit of such apparatus at every window of a bank or such, it is desirable to minimize the cost of the apparatus.

In order to overcome this contradiction, the present invention proposes provision of an elastic portion at a part of the transmission mechanism of the scanning driving means. As said before, the laterally slidable base 1 is moved slidingly through one scanning line pitch at one time by intermittently driving the feed screw 12 by the pulse motor 14; but, as a rubber-made belt 16 is used for transmitting the driving force from said pulse motor 14 to the feed screw 12, a slight error is produced in the amount of feed of the base 1 in each reciprocation due to elastic elongation or contraction of said belt 16 and the presence of a gap in meshed engagement with the pulleys. Therefore, the scanning line pitch of the engraved reproduced image becomes irregular in a certain limited range, but this, on the other hand, produces the effect of extinguishing non-uniformity of pitch of the scanning lines, or dots, in the reproduced image.

Generally, pitch irregularity in the halftone plate is manifested as an extremely conspicuous streak irregularity when a dot line or lines with a distorted pitch is mixed in the picture where the dot pitch is uniform as a whole, but in case the pitches of the respective dot lines are non-uniform and varied slightly from one another, the obtained image is rather recognized visually as having a uniform picture tone throughout the entire picture. Particularly, in the present invention, since the reproduced halftone image is utilized as a collation picture in a certification card, there is no possibility of producing moire that could otherwise be caused due to overlapped printing of plural colors in a meshy plate multi-color printing process.

As described above, the image engraving reproducing apparatus according to the present invention can eliminate the defects of the conventional method of pasting the photograph printing paper for manifesting the registrant's face picture on a certification card, such as credit card, and is capable of a preparing a most ideal certification card rapidly and with ease. Thus, the present invention is of very high utility in practical uses.

We claim:

1. An apparatus for reproducing an engraved image for exhibiting a portrait on a certification card comprising, a frame having a top portion, a first base horizontally movably mounted on said top portion of said first base, first drive means for laterally reciprocating said first base relative to said frame, a second base horizontally movably mounted on said first base, said second base having a top portion, second drive means for moving said second base a predetermined distance in a transverse relationship with respect to the direction of movement of said first base, said predetermined distance comprising one scanning pitch, an original picture base plate mounted on the top portion of said second base, a certification card base plate mounted on the top portion of said second base, a photoelectric scanning means on said frame and being disposed in horizontal stationary opposition to an original picture on said original picture base plate, an engraving scanning means on said frame and being disposed in horizontal stationary opposition to a certification card on said certification base plate, said engraving scanning means including a graver, said photoelectric scanning means scanning said original picture in linear succession to obtain an image signal current, means connecting said engraving scanning means and said photoelectric scanning means so that said image signal current is fed to said engraving scanning means, means for vibrating said engraving scanning means in a vertical relationship with respect to said certification card in response to said image signal current so that a halftone image is engraved on the certification card, the amplitude of said graver being controlled by said image signal current so as to vary the size of the engraved dots in response to the appearance of the original picture to reproduce a halftone image similar thereto, a linear encloder operatively connected to said first and second bases for producing a timing pulse signal, means connecting said linear encoder with said graver for controlling the dot pitch thereof, said second drive means comprising a pulse motor which is rotated intermittently upon reciprocation of said first base thereby causing said second base to move through one scanning pitch upon each reciprocation, said second drive means also comprising a feed screw threadably secured to said second base, an elastic transmission member connecting said pulse motor and said feed screw for extinguishing non-uniformity of pitch of the scanning dots in the reproduced image.

* * * * *